United States Patent
Lee et al.

(10) Patent No.: US 6,804,027 B2
(45) Date of Patent: *Oct. 12, 2004

(54) GRAY SCALE CALIBRATION TOOL FOR SETTING THE DENSITY OF A PRINTER

(75) Inventors: Ho Chong Lee, Endicott, NY (US); Larry David Teklits, Loveland, CO (US); Jack Louis Zable, Niwot, CO (US)

(73) Assignee: International Business Machines Corporation, Armonk, NY (US)

( * ) Notice: Subject to any disclaimer, the term of this patent is extended or adjusted under 35 U.S.C. 154(b) by 400 days.

This patent is subject to a terminal disclaimer.

(21) Appl. No.: 09/918,260

(22) Filed: Jul. 30, 2001

(65) Prior Publication Data

US 2002/0033966 A1 Mar. 21, 2002

Related U.S. Application Data

(63) Continuation of application No. 09/066,097, filed on Apr. 23, 1998, now Pat. No. 6,268,932.

(51) Int. Cl.⁷ ............................. B41B 5/08; G03G 15/01
(52) U.S. Cl. ........................ 358/1.9; 358/401; 358/406; 358/504
(58) Field of Search ................................ 358/1.9, 1.13, 358/1.14, 406, 448, 504, 520, 523, 531, 537, 162, 167, 179, 401, 455, 501, 521; 364/526; 382/270, 293, 162

(56) References Cited

U.S. PATENT DOCUMENTS

| | | | |
|---|---|---|---|
| 3,970,393 A | 7/1976 | Krygeris et al. | 356/425 |
| 4,706,206 A | 11/1987 | Benoit et al. | 382/167 |
| 5,198,910 A | 3/1993 | Ng et al. | 358/3.14 |
| 5,283,140 A | 2/1994 | Netz et al. | 430/6 |
| 5,347,369 A | 9/1994 | Harrington | 358/401 |
| 5,369,499 A | 11/1994 | Yip | 358/406 |
| 5,400,147 A | 3/1995 | Korn et al. | 347/253 |
| 5,426,519 A | 6/1995 | Banton | 358/533 |
| 5,462,841 A | 10/1995 | Carleer | 430/396 |
| 5,499,305 A | 3/1996 | Lidke et al. | 382/270 |
| 5,502,550 A | 3/1996 | Hori et al. | 399/74 |
| 5,805,178 A | 9/1998 | Silverbrook | 347/15 |
| 5,844,965 A | 12/1998 | Galkin | 378/207 |
| 5,919,390 A | 7/1999 | Childress | 319/725 |
| 5,924,426 A | 7/1999 | Galazin | 130/200 |
| 6,008,907 A | 12/1999 | Vigneau et al. | 358/1.9 |
| 6,034,711 A | 3/2000 | Trask et al. | 347/240 |
| 6,268,932 B1 * | 7/2001 | Lee et al. | 358/1.9 |

* cited by examiner

Primary Examiner—King Y. Poon
(74) Attorney, Agent, or Firm—Crawford Maunu PLLC

(57) ABSTRACT

Density calibration for a printer is achieved using a standard grey scale vignette master and a stored gray scale vignette image that the printer operator can invoke from the operator panel of a printer. The vignette image provides a precalibrated scale that is used in conjunction with the •standard• image to determine the proper optical density. The density is then set by the printer control panel based upon the value obtained by visually matching the two grey scale vignettes.

18 Claims, 4 Drawing Sheets

GRAY SCALE CALIBRATION TOOL FOR SETTING THE DENSITY OF A PRINTER

This application is a continuation of application Ser. No. 09/066,097, filed Apr. 23, 1998 now U.S. Pat. No. 6,268,932. The application is incorporated herein by reference.

BACKGROUND OF THE INVENTION

1. Field of the Invention

This invention relates to density calibration tools for setting the density output of printers, and more specifically, for using a print-out from a standard printer with known and controlled settings as a standard for comparison with output printed by a target printer sought to be calibrated.

2. Description of the Related Art

Images of varying "shades" can be printed using only a black toner or ink. The "shades" are produced by printing varying gray levels of black from 0 to 100% coverage. "Shades" or "gray levels" are also referred to as half-tones. A half-tone algorithm can be used by a printer for instructing that printer as to which "pel" or dot of ink to print for varying coverage amounts. For example, for 100% coverage, or darkest image, the printer would print a dot in every single pel. For 50% coverage, a dot would be printed in every other pel. Certain patterns of dots are used for the various amounts of coverage. Lighter half-tones or gray levels are produced as the coverage amounts decrease.

However, another factor that affects the lightness or darkness of an image is optical density. In other words, even though a part of an image may have 100% black coverage, that part of the image may appear lighter or darker depending upon its optical density.

For example, with 100% coverage using a toner or ink that is 100% perfectly black, there would be a reflectance value of zero (0), i.e., no light would be reflected back. The formula for optical density is the log of the background divided by the reflectance of the spot that is being examined. In other words, if the reflectance had a value of 10 (which is pretty dark), but the background is white having 90% reflectance, i.e., having a value of 90, the ratio is 9. The log to the base 10 of 9 is slightly less than 1, i.e., 0.954, which would be the value of the optical density.

In order to get good images when printing, the optical density of the printed toners has to be maintained. If optical density changes in the printer, then the images will change and the image quality may not be as good as desired. In high function and high cost printers, it is known to have a densitometer built into the printer to either completely automate the control of the density, or to semi-automate density control by including operator interactions. However, for low cost printers, the cost of having a densitometer, either built into the printer or available to the operator, is prohibitive. For example, a densitometer may cost one thousand dollars, but many low cost printers sell for less than this amount. A printer manufacturer can not afford to build a densitometer into a low cost printer and still keep the printer "low-cost". Likewise, most users of "low-cost" printers cannot afford the price of a densitometer as an extra tool for maintaining the optical density of the printer. Nevertheless, even for low cost printers there is a need to maintain optical density in order to provide quality print images.

In essence, monochrome halftone rendering is inconsistent among printers due to differences in the optical density produced by the printer for various gray scale levels. A densitometer is typically used to calibrate the printer to the correct optical density. However, this tool is not available to the average customer. There is a need to maintain image quality by maintaining optical density without using a densitometer.

SUMMARY OF THE INVENTION

The method, program, and tool of this invention enables an operator of a printer to set the density setting of the printer to achieve a desired image quality without using a densitometer. The density setting tool is made using a same type of printer, and same type of toner, as would be used by the operator. This same type of printer is referred to herein as the •standard• printer. The standard printer is set up, such as by the printer manufacturer, with the desired density output at a given density setting. A densitometer may be used in setting up the standard printer. A separate gray scale vignette is printed for each density setting of the standard printer. The gray scale vignettes are all printed using a same half tone algorithm. The gray scale vignettes are compared with each other to determine the amount of offset, in physical distance from the center of the vignette, there is between each of the vignettes in order that a point on each vignette matches (either visually or using a densitometer) in density with a point of another vignette. The distance, or amount of offset, is then known for each density setting from the nominal setting or from each of the other density settings.

A standard grey scale vignette is printed off using the standard printer at the nominal printer setting. The standard gray scale vignette may also contain an aperture such as an aperture that is positioned at the center of the vignette. The standard vignette is made available to the operator. Along with this standard gray scale vignette is sent a file for the operator to print out using the operator's printer. The file contains a gray scale test vignette using a same halftone algorithm as was used to print out the standard gray scale vignette. Either the standard vignette or the test vignette will contain tick marks at distances apart from each other that correspond to the distances associated with each density setting of the standard printer as determined above.

After printing out a test vignette using the operator's printer, the operator will lay the standard vignette over the test vignette such that a portion of the test vignette can be viewed through the aperture of the standard vignette. The operator then aligns the test vignette such that the portion of the test vignette appearing through the aperture visually matches in density the portion of the standard gray scale vignette immediately surrounding the aperture. When aligned, the amount of offset between the two vignettes is noted as indicated by a tick mark corresponding to that amount of offset. The specific tick mark indicates the density setting that the operator must adjust the printer to in order to get the desired density output.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

The method, tool, and program of this invention provides an aid to assist an operator in "eyeballing" the amount of adjustment to be made to control the print density of a printer. The method will be described below with reference to FIG. 1 and FIG. 8, and the tool will be described below with reference to FIGS. 2–6. The program or file used to create the tool will be described further below.

Figure 1:
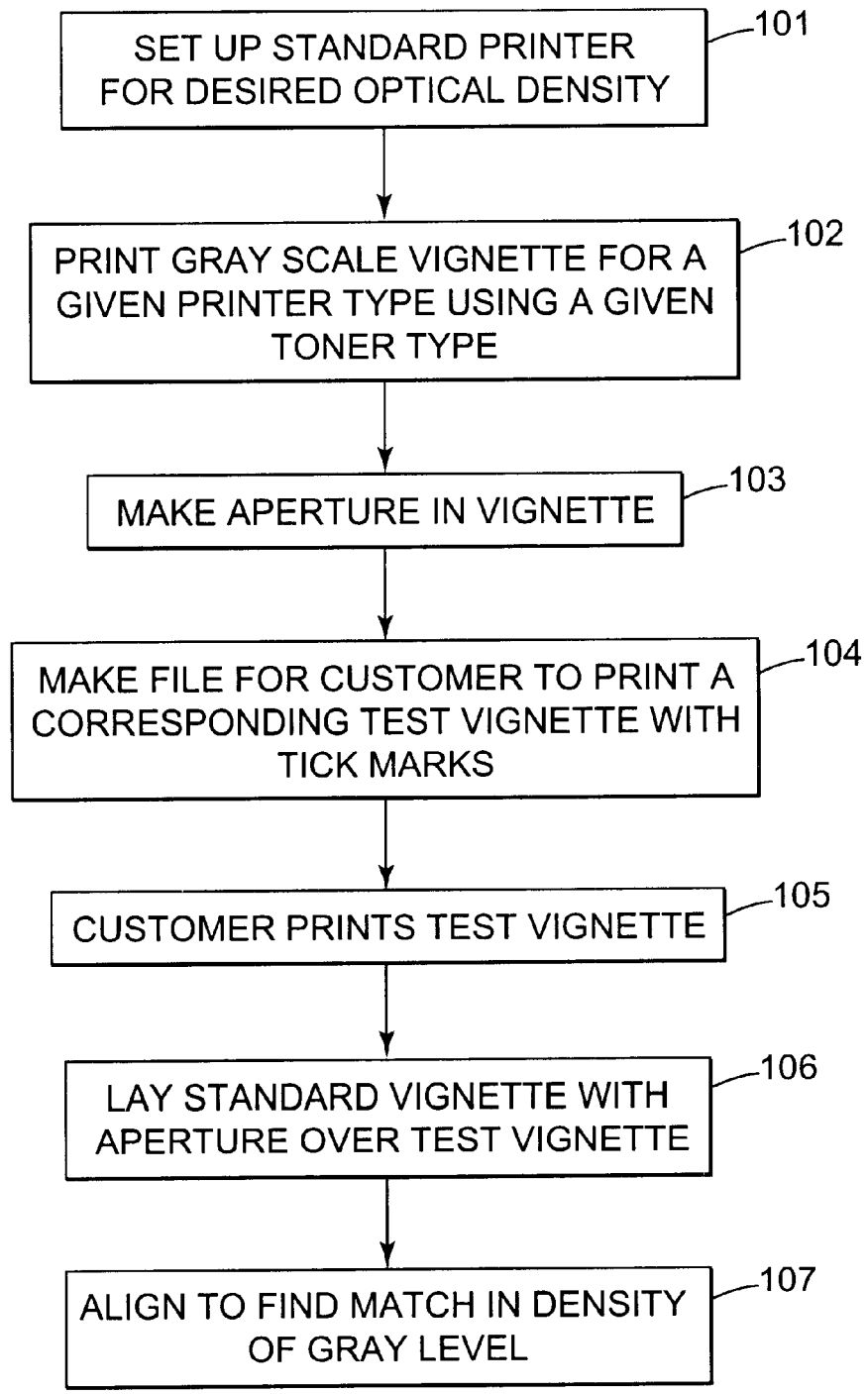
FIG. 1 illustrates the method steps in creating a standard vignette and a test vignette, and using the vignettes to adjust the density of a printer.
Figure 2:
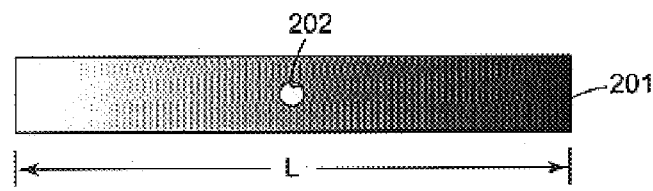
FIG. 2 illustrates a standard vignette with an aperture.

A multitude of gray scale vignettes are printed, step 102 FIG. 1, using an ideal or standard printer that is set up, step 101, with the desired optical density. The gray scale vignette has a smooth increase in optical density from white to black. The more gray levels the ideal printer can print, the more gradual is the increase in optical density from white to black. As the number of gray levels a printer can print diminishes, the segments within the vignette become more pronounced with distinct individual gray levels.

A half-tone algorithm is used to print varying pel or dot patterns for 0% to 100% coverage, i.e., a gray scale from white to black. Basically, the gray scale vignettes are a series of dots. However, each segment of the vignette is a gray scale simulation in that it is a series of dots that are making up what is called a gray level. In the preferred embodiment, there are 256 gray levels; with no dots, i.e., white, as one of the gray levels. The pattern for the 256 gray levels, created from a half-tone algorithm, can be fed into a printer, either through postscript or PCL or other language, and the printer will print out the gray level pattern. This is done with a standard printer having a desired optical density. The multitude of vignettes that are printed are referred to as standard vignettes because they represent a printer/toner combination set up as a standard under controlled conditions to produce a desired or "ideal" optical density.

A printer manufacturer, or other entity, will create the standard vignettes for each type of printer and for each given type of toner, step 102, by using a densitometer to guarantee a desired optical density setting of the printer. The standard vignettes are created under standard conditions while ensuring that the results are repeatable. A multitude of these vignettes will be made in order to ship at least one with each printer manufactured to the customer, or to others who have this particular type of printer with this particular type of toner. The standard vignette 201, FIG. 2, has an aperture 202 punched in it, such as midway along the vignette, i.e., at the 50% coverage point, step 103 FIG. 1.

A file, using Postscript, PCL, or other language, is also sent to the customer so that the customer can periodically print the customer's own test vignette for calibrating the density of the customer's printer. The gray scale test vignette will correspond to the gray scale standard vignette in that they will both be the same length, see FIG. 2 and FIG. 3, and they will both use the same varying dot patterns along the length of the vignettes, i.e., they will both use the same half tone algorithm to create the gray levels, step 104.

Figure 3:
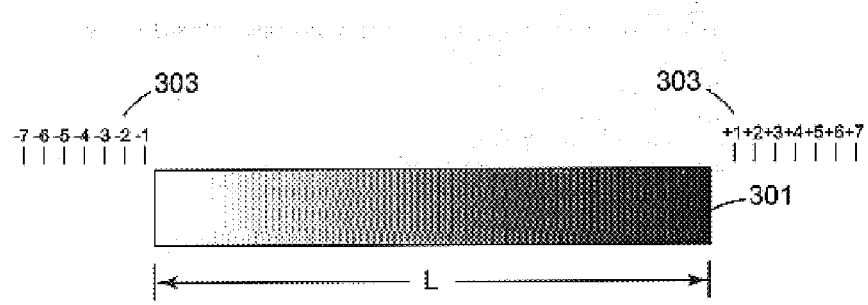
FIG. 3 illustrates a test vignette with tick marks outside the length of the test vignette.
Figure 4:
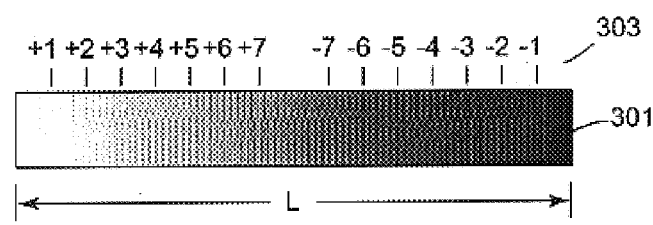
FIG. 4 illustrates a test vignette with tick marks within the length of the test vignette.

In addition to printing the vignette, the file will cause a printing of certain tick marks 303, FIG. 3 at predetermined distances from the end of the test vignette. In other words, the file will print out a test vignette with tick marks and corresponding numbers or values as shown in FIG. 3. Other embodiments may print out the tick marks as shown in FIG. 4, with the tick marks along the length of the vignette. The rendering of tick marks in FIG. 3 and FIG. 4 are equivalent.

Figure 5:
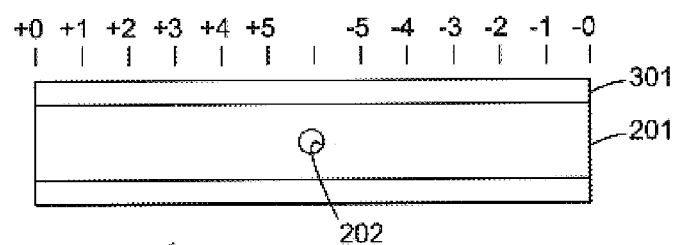
FIG. 5 illustrates a standard vignette laid over a test vignette, with gray levels not shown.
Figure 6:
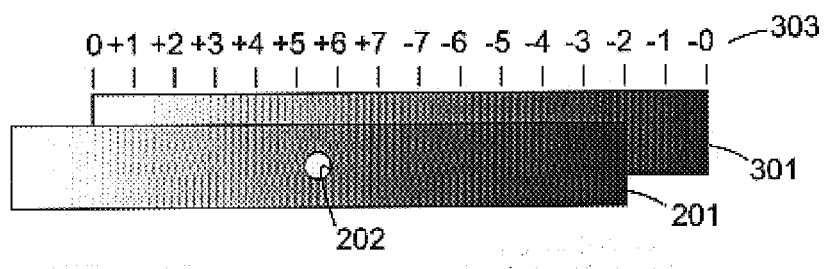
FIG. 6 illustrates a density match by sliding the standard vignette with respect to the test vignette.
Figure 7:
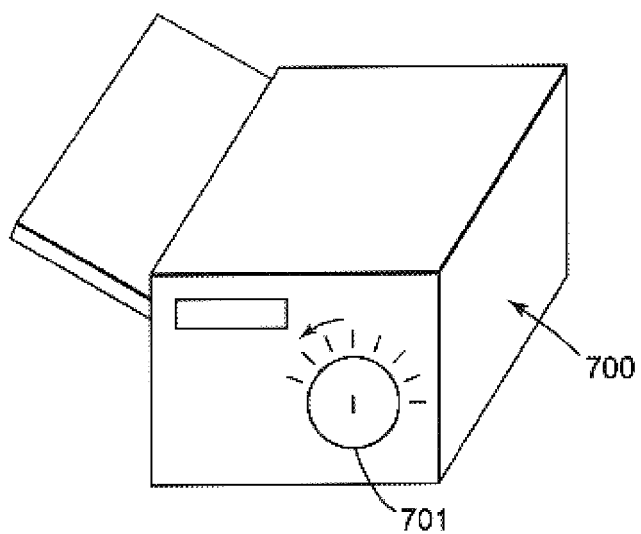
FIG. 7 shows a density knob on a printer.

In operation, the customer will hit a button on the printer and it will tell the customer, through a display screen interface or lighted display panel light, to "print the test case". The vignette shown in FIG. 3 or FIG. 4 will then be printed, step 105. The customer then takes the standard vignette and lays it on top of the test case, step 106 and as shown in FIG. 5. The customer looks to see if there is a match in the gray level of the test vignette that is coming through the aperture 202 with the gray level that is immediately surrounding the aperture 202 on the standard vignette. If there is a direct match when the two vignettes are evenly aligned with each other, then the customer does not make any adjustments to the density control of the customer's printer. If there is not an immediate match, the customer moves the standard vignetted either to the left or to the right until there is a match, step 107. When the customer eyeballs a match in the gray levels, then the customer looks to see with which tick mark the edge of the vignette is lined up. In the case as shown in FIG. 6, it will be −2 because the customer had to move the standard to the left to find a match. This means that the test pattern was too dark and the customer had to go toward the lighter end. If the test vignette is too dark, the density setting 701, FIG. 7, on the printer 700 should be decreased.

The tick marks printed out by the file with the printed test vignette is calibrated so that each of the tick marks correspond to a tick mark on a density control 701 of a designated printer 700. The density control could be a knob, a LCD display, or other interface for adjusting the density of the printer by an operator. For example, using the reading as shown in FIG. 6, the operator would turn the density knob on the printer 700, FIG. 7, down 2 indications.

Figure 8:
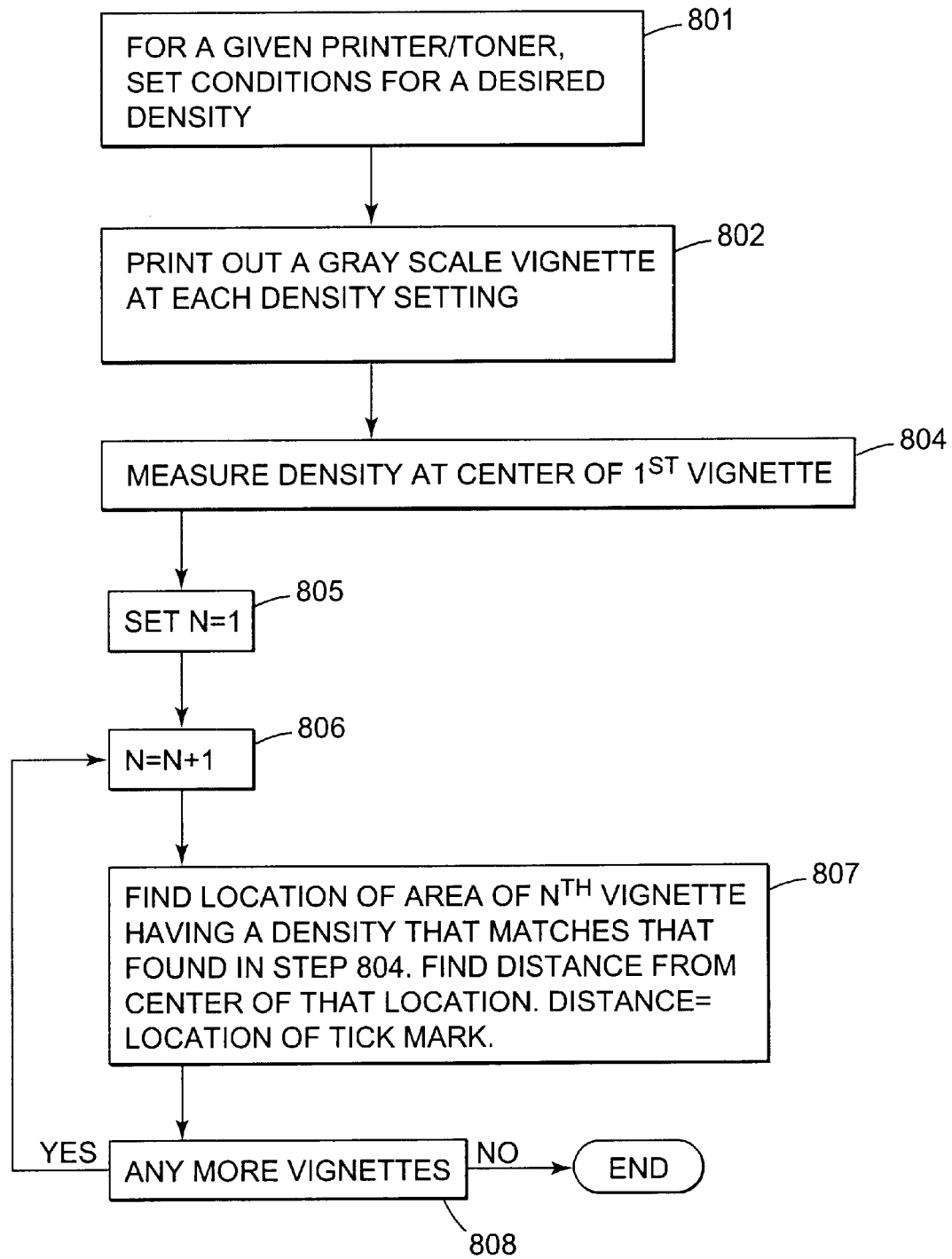
FIG. 8 shows the method steps used to establish the tick marks on the test vignette.

The placement of the tick marks for a specific type of printer/toner combination were determined according to the following description with reference to the method steps shown in FIG. 8. First, on a given printer with a given type of toner, all varying conditions are controlled, where possible, to achieve a desired or "ideal" density for that type of printer, step 801. Then a separate vignette is printed out at each density setting of the printer, step 802. For example, a first vignette is printed out at density setting 0, a second vignette is printed out at density setting 1, etc. Different types of printers may each have a different number of density settings. For the printer used in the preferred embodiment, the number of density settings is fifteen. In this case, fifteen separate vignettes would be printed. For other types of printers, there may only be five different density settings. For those printers, there would be a total of five vignettes printed; one for each density setting.

Then, for the given printer used for setting up the tick marks, the vignettes for each density setting are examined to determined the amount of displacement necessary in order to match densities. For more accuracy in creating the file that specifies the location of the tick marks on a printed vignette, a densitometer is used to measure the density of each vignette from each density setting. For example, a density reading is taken at the center of the first vignette printed out at a density setting of zero, step 804. Then, density readings are taken along the second vignette to determine where the same density reading occurs as for the center of the first vignette. The location, i.e., distance from the center, of this same density reading is noted as the first tick mark from the end of vignette stored in the file, steps 805–808. The vignettes from the other density settings are determined in the same way, either from the first vignette printed at a density setting of zero or from any previous vignette.

Other embodiments of the invention may have the tick marks on the standard vignette, and the aperture on one or the other vignettes. The tick marks indicate the relative movement made between the standard and test vignettes in order to match densities.

Other embodiments to the above described invention may have multiple viewing apertures in the standard vignette. For example, viewing apertures at one-third and two-thirds of the way along the length of the standard vignette enables the operator to match two points on a density vs. gray scale curve instead of just one. It may be easier for an operator to try to find the location(s), i.e., gray levels, on the test vignette where two or more areas, i.e., gray levels, on the standard vignette appear to match. With one aperture in the center of the standard vignette, the operator attempts to find a point on the test vignette that matches the density of 50% coverage of the toner of the standard printer. With two apertures, the density vs. gray level curve is changed so that a given match must fit two points instead of just going through the one point.

In the preferred embodiment, the aperture used was a circle, but it could be a slit or other shape. Ideally, the aperture is small enough to have enough gray level on the standard vignette showing around the aperture to enable a better match of the underlying test vignette. The vignettes used in the preferred embodiment were fairly continuous in the gray levels. Other preferred embodiments may have more distinct increments, i.e., discreet segments, of gray levels. Although the preferred embodiment was used for black toner, the invention is applicable to setting the density of any colored toner. Also, the standard vignette can be encapsulated in a protective clear coating to protect it over time and with use.

The standard vignette is also marked as to a type of printer, such as an IBM 4019, with a certain type of toner. If an operator changes the toner cartridge, the operator will need to use a different standard vignette that has been provided for that same type of printer but with the different toner type. For example, manufacturers can ship a new vignette for different types of toner for a given type of printer. The vignette would be different for toners from different manufacturers, and it would also be different for different toners from a same toner manufacturer if the silicone content of the toner was changed or other properties of the toner were changed that changed the optical density properties of the toner. Otherwise, the standard vignette provided by a manufacturer for a given toner should be indicative of an average of various batches of the same toner. However, there may be some degree of error from toner to toner.

Using the foregoing specification, various aspects of the invention may be implemented as a machine, process, or articles of manufacture.

Any resulting program(s) or file(s), having computer readable code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing or printing systems including, but not limited to, cpu, memory/storage devices, communication links, communication/transmitting devices, servers, I/O devices, or any subcomponents or individual parts of one or more processing or printing systems, including software, firmware, hardware or any combination or subcombination thereof, which embody the invention as set forth in the claims.

While the preferred embodiment of the present invention has been illustrated in detail, it should be apparent that modifications and adaptations to that embodiment may occur to one skilled in the art without departing from the spirit or scope of the present invention as set forth in the following claims.

We claim:

1. A computer-readable medium having computer-executable instructions for adjusting an optical density setting of a target printer, the computer-executable instructions performing steps comprising:

causing a gray scale test vignette indicative of an optical density to be printed on the target printer;

printing tick marks with values separated by predetermined distances along a length of the gray scale test vignette, wherein the value of each of the tick marks corresponds to an optical density adjustment amount indicator, and wherein a particular one of the optical density adjustment amount indicators identified upon matching the optical densities of the gray scale test vignette and a gray scale reference vignette identifies a value for an adjustment amount for the optical density setting of the target printer.

2. The computer-readable medium as in claim 1, wherein the computer-executable instructions for causing a gray scale test vignette to be printed on the target printer comprise computer-executable instructions for creating an aperture on the gray scale test vignette to facilitate the matching of the optical densities of the gray scale test vignette and the gray scale reference vignette.

3. The computer-readable medium as in claim 1, wherein the computer-executable instructions for causing a gray scale test vignette to be printed on the target printer comprise computer-executable instructions for associating adjustment characters with each of the optical density adjustment amount.

4. The computer-readable medium as in claim 3, wherein the adjustment characters comprise adjustment numerals.

5. The computer-readable medium as in claim 4, wherein the adjustment numerals comprise positive numerals indicative of recommended adjustment of the optical density setting of the target printer in a first direction of optical density, and wherein the adjustment numerals comprise negative numerals indicative of recommended adjustment of the optical density setting of the target printer in an opposite direction of optical density.

6. The computer-readable medium as in claim 1, wherein the computer-executable instructions further perform steps comprising adjusting the optical density setting of the target printer based on an input corresponding to the optical density adjustment amount indicator identified upon matching the optical densities of the gray scale test vignette and the gray scale reference vignette.

7. A computer-readable medium having computer-executable instructions for adjusting an optical density setting of a target printer, the computer-executable instructions performing steps comprising:

causing a gray scale test vignette indicative of an optical density to be printed on the target printer;

printing tick marks with values separated by predetermined distances substantially along a longitudinal axis and external to a length of the gray scale test vignette, wherein the value of each of the tick marks corresponds to an optical density adjustment amount indicator, and wherein a particular one of the optical density adjustment amount indicators identified upon matching the optical densities of the gray scale test vignette and a gray scale reference vignette identifies a value for an adjustment amount for the optical density setting of the target printer.

8. The computer-readable medium as in claim 7, wherein the computer-executable instructions for causing a gray scale test vignette to be printed on the target printer comprise computer-executable instructions for creating an aperture on the gray scale test vignette to facilitate the matching of the optical densities of the gray scale test vignette and the gray scale reference vignette.

9. The computer-readable medium as in claim 7, wherein the computer-executable instructions for causing a gray scale test vignette to be printed on the target printer comprise computer-executable instructions for associating adjustment characters with each of the optical density adjustment amount indicators.

10. The computer-readable medium as in claim 9, wherein the adjustment characters comprise adjustment numerals.

11. The computer-readable medium as in claim 10, wherein the adjustment numerals comprise positive numerals indicative of recommended adjustment of the optical density setting of the target printer in a first direction of optical density, and wherein the adjustment numerals comprise negative numerals indicative of recommended adjustment of the optical density setting of the target printer in an opposite direction of optical density.

12. The computer-readable medium as in claim 7, wherein the computer-executable instructions further perform steps comprising adjusting the optical density setting of the target printer based on an input corresponding to the optical density adjustment amount indicator identified upon matching the optical densities of the gray scale test vignette and the gray scale reference vignette.

13. A tool for use in adjusting an optical density setting on a target printer, the tool comprising:

a gray scale reference vignette printed by a standard printer having a desired optical density level; and tick marks with values, positioned at predetermined distances relative to the gray scale reference vignette, wherein the predetermined distances between the tick marks correspond to optical density adjustment amount indicators, and wherein a particular one of the optical density adjustment amount indicators identified upon matching the optical densities of the gray scale reference vignette and a gray scale test vignette printed by the target printer identifies a value for an adjustment amount for the optical density setting of the target printer.

14. The tool of claim 13, wherein the gray scale reference vignette comprises at least one aperture to facilitate the matching of the optical densities of the gray scale reference vignette and the gray scale test vignette.

15. The tool of claim 13, wherein the tick marks positioned at predetermined distances relative to the gray scale reference vignette are positioned at predetermined distances along the gray scale reference vignette.

16. The tool of claim 13, wherein the tick marks positioned at predetermined distances relative to the gray scale reference vignette are positioned at predetermined distances substantially along a longitudinal axis of the gray scale reference vignette and external to gray scale shadings of the gray scale reference vignette.

17. The tool of claim 13, further comprising adjustment characters associated with each of the tick marks to identify the adjustment amount to calibrate the optical density setting of the target printer.

18. The tool of claim 17, wherein the adjustment characters comprise adjustment numerals providing a numeric adjustment amount to calibrate the optical density setting of the target printer.

* * * * *

UNITED STATES PATENT AND TRADEMARK OFFICE
CERTIFICATE OF CORRECTION

PATENT NO. : 6,804,027 B2
DATED : October 12, 2004
INVENTOR(S) : Lee et al.

It is certified that error appears in the above-identified patent and that said Letters Patent is hereby corrected as shown below:

Column 6,
Line 67, "amount." should read -- amount indicators. --.

Signed and Sealed this

Twenty-eighth Day of June, 2005

JON W. DUDAS
*Director of the United States Patent and Trademark Office*